(12) United States Patent
Maguire et al.

(10) Patent No.: US 7,563,191 B2
(45) Date of Patent: Jul. 21, 2009

(54) WIDE RATIO TRANSMISSION

(75) Inventors: Joel M. Maguire, Northville, MI (US); Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 357 days.

(21) Appl. No.: 11/347,409

(22) Filed: Feb. 3, 2006

(65) Prior Publication Data

US 2007/0184933 A1     Aug. 9, 2007

(51) Int. Cl.
*F16H 3/62* (2006.01)
(52) U.S. Cl. ................................ 475/276; 475/281
(58) Field of Classification Search .......... 475/275–291
See application file for complete search history.

(56) References Cited

U.S. PATENT DOCUMENTS

| | | | |
|---|---|---|---|
| 6,139,463 A * | 10/2000 | Kasuya et al. .............. 475/275 |
| 6,375,592 B1 | 4/2002 | Takahashi et al. ........... 475/262 |
| 6,425,841 B1 | 7/2002 | Haka ........................... 475/275 |
| 6,471,615 B1 | 10/2002 | Naraki et al. ............... 475/262 |
| 6,558,287 B2 | 5/2003 | Hayabuchi et al. .......... 475/271 |
| 6,669,597 B1 * | 12/2003 | Usoro et al. ................ 475/323 |
| 2004/0053736 A1 * | 3/2004 | Usoro et al. ................ 475/296 |
| 2005/0215382 A1 | 9/2005 | Raghavan et al. |

* cited by examiner

*Primary Examiner*—Richard M. Lorence
*Assistant Examiner*—Edwin A. Young (57) ABSTRACT

A transmission is provided that utilizes a unique packaging scheme for torque-transmitting mechanisms and gear drive members in order to minimize the overall axial length of the transmission. Specifically, the transmission may include a clutch housing that is connected for common rotation with a transmission input member. A rotatable hub member may be connected for common rotation with both the clutch housing and a gear member, thereby connecting the gear member for common rotation with the input member. Preferably, the rotatable hub member is connected to the clutch housing by the reaction plates that extend from the clutch housing. First and second torque-transmitting mechanisms may be packaged within the clutch housing.

7 Claims, 4 Drawing Sheets

FIG. 1

| | Ratios | 60 | 62 | 64 | 66 | 67 | 68 | 69 |
|---|---|---|---|---|---|---|---|---|
| Reverse #3 | -8.79 | X | X | | | | | |
| Reverse #2 | -4.85 | X | | | | X | | |
| Reverse #1 | -2.70 | X | | | | | | X |
| Neutral | 0.00 | | | | X | | | |
| 1 | 5.02 | | X | | X | | | |
| 2 | 2.77 | | | | X | X | | |
| 3 | 1.54 | | | | X | | | X |
| 4 | 1.00 | | | | X | | X | |
| 5 | 0.83 | | | | | | X | X |
| 6 | 0.73 | | | | | X | X | |
| 7 | 0.69 | | X | | | | X | |
| 8 | 0.64 | | | X | | | X | |

(X = Engaged Clutch)

FIG. 2

| Ratio Spread | 7.88 |
|---|---|
| Ratio Steps | |
| Reverse #1/1 | -0.54 |
| 1/2 | 1.81 |
| 2/3 | 1.79 |
| 3/4 | 1.54 |
| 4/5 | 1.20 |
| 5/6 | 1.14 |
| 6/7 | 1.07 |
| 7/8 | 1.08 |

| | Ratios | 60 | 62 | 66 | 67 | 68 | 69 |
|---|---|---|---|---|---|---|---|
| Reverse #3 | -8.79 | X | X | | | | |
| Reverse #2 | -4.85 | X | | | X | | |
| Reverse #1 | -2.70 | X | | | | | X |
| Neutral | 0.00 | | | X | | | |
| 1 | 5.02 | | X | X | | | |
| 2 | 2.77 | | | X | X | | |
| 3 | 1.54 | | | X | | | X |
| 4 | 1.00 | | | X | | X | |
| 5 | 0.83 | | | | | X | X |
| 6 | 0.73 | | | | X | X | |
| 7 | 0.69 | | X | | | X | |

(X = Engaged Clutch)

FIG. 5

| Ratio Spread | 7.88 |
|---|---|
| Ratio Steps | |
| Reverse #1/1 | -0.54 |
| 1/2 | 1.81 |
| 2/3 | 1.79 |
| 3/4 | 1.54 |
| 4/5 | 1.20 |
| 5/6 | 1.14 |
| 6/7 | 1.07 |

WIDE RATIO TRANSMISSION

TECHNICAL FIELD

The present invention relates to a transmission having a rotatable hub member that connects a gear member to a clutch housing that rotates with an input member.

BACKGROUND OF THE INVENTION

Wide ratio transmissions such as seven or eight speed transmissions offer several advantages including improved vehicle acceleration performance and potentially improved fuel economy over four, five and six speed transmissions. However, increasing the number of speed ratios presents challenges in packaging additional clutches, drive mechanisms for the various gear members, and hydraulic circuit feed paths, and in insuring an overall axial length that is acceptable.

SUMMARY OF THE INVENTION

A transmission is provided that utilizes a unique packaging scheme for torque-transmitting mechanisms and gear drive members in order to minimize the overall axial length of the transmission. Specifically, the transmission may include a clutch housing that is connected for common rotation with a transmission input member. A rotatable hub member may be connected for common rotation with both the clutch housing and a gear member, thereby connecting the gear member for common rotation with the input member. Preferably, the rotatable hub member is connected to the clutch housing by the reaction plates that extend from the clutch housing.

First and second torque-transmitting mechanisms may be packaged within the clutch housing. The torque-transmitting mechanisms have friction plates that are selectively engagable with at least some of the reaction plates to thereby connect the input member with respective different gear members. The rotatable hub member may be packaged between the first and second torque-transmitting mechanisms, minimizing required axial packaging space and thereby the overall axial length of the transmission.

In one aspect of the invention, one of the torque-transmitting mechanisms packaged radially inward of the rotatable clutch housing is selectively engagable to connect for common rotation with the clutch housing a member of a planetary gear set that is spaced axially from the rotatable clutch housing. Two other planetary gear sets are located between the planetary gear set and the clutch housing. By locating the first torque-transmitting mechanism radially inward of the clutch housing adjacent the second torque-transmitting mechanism rather than adjacent the planetary gear set member that it selectively connects with the clutch housing, common hydraulic feed may be utilized for the two torque-transmitting mechanisms, eliminating the need to route hydraulic feed to the axial location of the planetary gear set.

In referring to first, second and third planetary gear sets in this description and in the claims, these sets may be counted "first" to "third" in any order in the drawings (i.e., left to right, right to left, etc.). Additionally, the first, second or third members of each planetary gear set may be counted "first" to "third" in any order in the drawings (i.e., top to bottom, bottom to top, etc.) for each gear set.

In another aspect of the invention, additional torque-transmitting mechanisms may be supplied to obtain up to eight forward speed ratios and three reverse speed ratios. Preferably, a center support of the transmission housing is utilized to provide torque reaction and hydraulic feed for at least some of the additional torque-transmitting mechanisms. The invention also provides a minimum content transmission that obtains seven forward speed ratios utilizing only five torque-transmitting mechanisms. This transmission includes a first interconnecting member that continuously interconnects a first member of the first planetary gear set with the first member of the second planetary gear set and a second interconnecting member that continuously interconnects the second member of the second planetary gear set with the first member of the third planetary gear set. Additionally, the third member of the second planetary gear set is continuously connected with a stationary member such as the transmission housing.

Three reverse speed ratios may be obtained by the minimum content transmission described above by adding a selectable one-way hydraulic clutch actuatable to ground one of the members of the planetary gear sets to the stationary member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
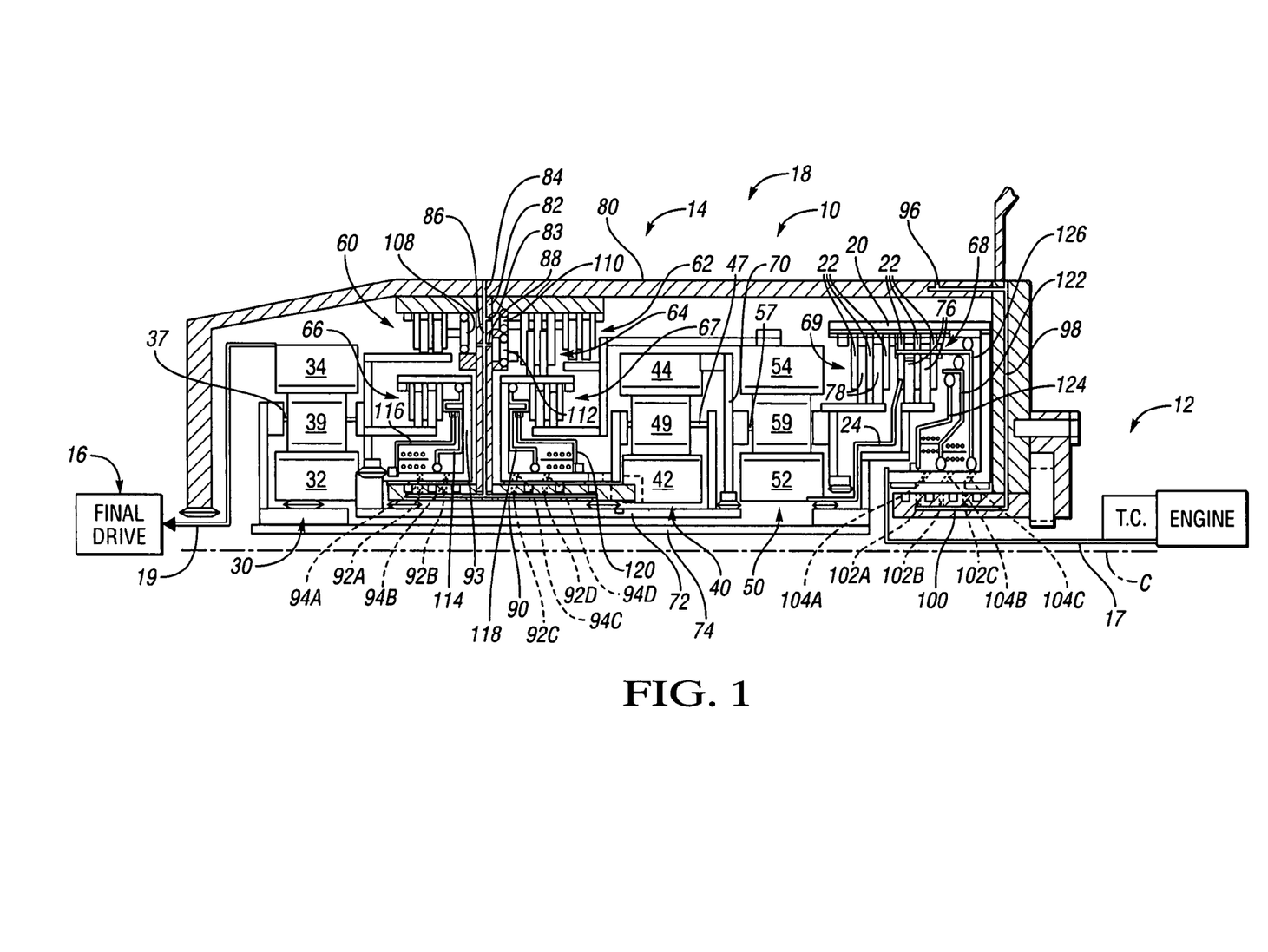
FIG. 1 is a schematic cross-sectional representation of a first embodiment of a powertrain including a transmission having three planetary gear sets and seven torque-transmitting mechanisms with two of the torque-transmitting mechanisms packaged within a rotatable clutch housing connected with an input member and having a gear member connected with the input member via the rotatable clutch housing.

Referring to the drawings, wherein like reference numerals represent the same or corresponding components through the several views, shown in FIG. 1, a powertrain 10 having a convention engine and torque converter 12, a planetary transmission 14 and a convention final drive mechanism 16. Only the top half of the transmission 14 is depicted.

The planetary transmission 14 includes an input member or shaft 17 continuously connected with the engine and torque converter 12, a planetary gear arrangement 18, and an output member or shaft 19 continuously connected with the final drive mechanism 16.

Packaging of Drive Member

A rotatable clutch housing 20 is continuously connected with the input member 17 and rotates therewith. A plurality of reaction plates 22 extend radially inward from the clutch housing 20. The clutch housing 20 is annular, forming a generally C-shaped channel. A rotatable hub member 24 is connected for common rotation with at least one of the plates 22 such that the hub member 24 rotates commonly with the clutch housing 20 and the input member 17. The hub member 24 may also be referred to as a drive member.

The planetary gear arrangement 18 includes three planetary gear sets 30, 40 and 50. The planetary gear set 30 includes a sun gear member 32, a ring gear member 34, and a planet carrier member 37 (referred to as a second gear member in the claims). As used in the claims, a "gear member" may be a sun gear member, a ring gear member a carrier member or a pinion gear. The planet carrier member 37 rotatably supports a plurality of pinion gears 39 that are disposed in meshing relationship with both the sun gear member 32 and the ring gear member 34.

The planetary gear set 40 includes a sun gear member 42, a ring gear member 44, and a planet carrier member 47. The planet carrier member 47 rotatably supports a plurality of pinion gears 49 that are disposed in meshing relationship with both the sun gear member 42 and the ring gear member 44.

The planetary gear set 50 includes a sun gear member 52 (referred to as a first gear member in the claims), a ring gear member 54, and a planet carrier member 57 (refereed to as a third gear member in the claims). The planet carrier member 57 rotatably supports a plurality of pinion gears 59 that are disposed in meshing relationship with both the sun gear member 52 and the ring gear member 54.

The rotatable hub member 24 is continuously connected with the sun gear member 52. Thus, the sun gear member 52 is connected for common rotation with the input member 17 via the rotatable hub member 24, and the clutch housing 20.

The transmission 14 also includes seven torque-transmitting mechanisms 60, 62, 64, 66, 67, 68 and 69. The torque-transmitting mechanisms 60, 62 and 64 are brakes, while the torque-transmitting mechanisms 66, 67, 68 and 69 are rotating clutches.

The input shaft 17 is continuously connected with the sun gear member 52 via the clutch housing 20 and the rotatable hub member 24. The output shaft 19 is continuously connected with ring gear member 34. An interconnecting member 70 continuously interconnects the ring gear member 44 and the carrier member 57. An interconnecting member 72 continuously connects the sun gear member 32 and the carrier member 47. An interconnecting member 72 is. a sleeve shaft. The sun gear member 42 is continuously grounded to the transmission housing 80 via a center support member 82 which extends from the transmission housing 80. The support member 82 may be integral with or a unitary part of the transmission housing 80 or may be a separate component. The transmission housing 80 may also be referred to as a stationary member or a casing.

The carrier member 37 is selectively connectable with the transmission housing 80 via the brake 60. The ring gear member 54 is selectively connected to the transmission housing 80 via the brake 62. The carrier member 47 is selectively connectable with the transmission housing 80 through the brake 64. The carrier member 37 is selectively connectable to the sun gear member 32 and with the carrier member 47 via the clutch 66. The carrier member 47 is selectively connectable with the ring gear member 54 via the clutch 67. The carrier member 37 is selectively connectable with the input member 17 via the clutch 68. The carrier member 57 is selectively connectable with the input member 17 via the clutch 69.

Clutch Packaging Arrangement

As shown in FIG. 1, both the first and second clutches 68, 69 are packaged radially inward of and enveloped by the clutch housing 20. The clutch 68 includes friction plates 76 that are selectively engagable with reaction plates 22 on a first side of the hub member 24 (the right side in FIG. 1) via selective hydraulic actuation of the apply piston 122. The friction plates 76 are connected for common rotation with the carrier member 37 via sleeve shaft 74 which rotates about a center axis of rotation C. The interconnecting member 72 which is also a sleeve shaft, rotates concentrically with the sleeve shaft 74. In fact, the input member 17 and the output member 19, the planetary gear sets 30, 40 and 50 as well as the rotating portions of the torque-transmitting mechanisms rotate concentrically about the axis C.

The clutch 69 includes friction plates 78 which are connected for common rotation with the carrier member 57. The friction plates 78 are selectively engagable with reaction plates 22 on an opposite, second side of the hub member 24 (the left side in FIG. 1). Thus, selective hydraulic actuation of an apply piston 126 engages the clutch 69 such that driving power from the input member 17 is relayed to the carrier member 57 via the clutch housing 20.

Hydraulic Feed and Torque Reaction

The torque-transmitting mechanisms are clustered near one another to allow common hydraulic feed paths for supplying hydraulic fluid to selectively engage the torque-transmitting mechanisms. Integration of hydraulic feed to the torque-transmitting mechanisms minimized machining costs and simplifies componentry and assembly. For instance, the torque-transmitting mechanisms 60, 62, 64, 66 and 67 are fed hydraulic fluid via channels formed in the center support 82. A valve body and electronic controller (not shown) are positioned to feed hydraulic fluid from a fluid source such as a pump through channel 84 formed through the transmission casing 80. Channel 86 formed in support 82 aligns with channel 84. Channel 86 may be formed, bored or otherwise machined through the support 82. Channel 83 extends from channel 86 to allow hydraulic fluid to pressurize piston 110 when engagement of brake 62 is desired. Similarly channel 88 extends from channel 84 to allow hydraulic fluid flow to either piston 112 to allow selective engagement of brake 64 or to pressurize piston 108 to allow selective engagement of brake 60. Internal valves (not shown) are positioned within one or more of the channels 83, 84, 86 and 88 to selectively open when flow through one of the channels to cause engagement of one of the pistons is desired. Because reaction plates for brakes 60, 62 and 64 are splined to an axially extending portion of the center support member 82, the center support member 82 acts as a torque reaction member when any of the brakes 60, 62 or 64 is applied.

Channel 90 runs axially and is in fluid communication with channel 86. Channels 92A, 92B, 92C and 92D are formed machined or otherwise provided in an axially extending portion of the center support 82 in fluid communication with channel 90. Channels 94A and 94B are formed in rotatable hub member 93 such that channel 94A aligns axially with channel 92A and channel 94B aligns axially with channel 92B. Thus, selective engagement of clutch 66 is achieved by fluid flow through channels 84, 86, 90, 92B and 94B to pressurize piston 114, thereby engaging clutch 66. Fluid flow through channel 92A and channel 94A controls pressure in a balance dam formed between piston 114 and dam member 116. Similarly, fluid through channels 84, 86, 90, 92C and 94C pressurizes piston 118 to selectively engage clutch 67. Pressure through channels 84, 86, 90, 92D and 94D controls pressure in a balance dam chamber formed between piston 118 and dam member 120.

Hydraulic feed for clutches 68 and 69 is similarly integrated. Hydraulic feed from the valve body, fluid source and electronic controller (not shown) is provided through channel 96 to channel 98 and channel 100 all of which are formed or otherwise machined in the transmission casing 80. Channels 102A, 102B and 102C radially extend from channel 100 and axially align with channels 104A, 104B and 104C respectively formed in the clutch housing 20. When engagement of the clutch 68 is desired, internal valves within the channels allows fluid flow through channel 102B and channel 104B to pressurize apply piston 122 and thereby engage the clutch 68. When selective engagement of clutch 69 is desired, the internal valves direct fluid flow from channels 96, 98 and 100 through channels 102C and 104C to pressurize apply piston 126. Fluid may be directed through channels 102A and 104A into a chamber formed between dam member 124 and apply piston 122 to counteract fluid pressure in the apply chamber formed between pistons 122 and 126 or the chamber formed between the clutch housing 20 and apply piston 126.

Establishment of Multiple Speed Ratios

The input shaft 17 is continuously connected with the sun gear member 52 through the clutch housing 20 and hub member 24. The ring gear member 44 is continuously connected with the carrier member 57 through the interconnecting member 70. The sun gear member 32 is continuously connected with the carrier member 47 through the interconnecting member 72. The sun gear member 42 is continuously grounded to the transmission housing 80 through the center support 82.

The carrier member 37 is selectively grounded to the transmission housing 80 through the brake 60. The ring gear member 54 is selectively grounded to the transmission housing 80 through the brake 62. The carrier member 47 and the sun gear member 32 (via the interconnecting member 72) are selectively grounded to the transmission housing 80 through the brake 64. The carrier member 37 is selectively connectable with the sun gear member 32 through the clutch 66. The carrier member 47 and the sun gear member 32 are selectively connectable with the ring gear member 54 through the clutch 67. The input member 17 is selectively connectable with the carrier member 37 through the clutch 68. The input member 17 is selectively connectable with the carrier member 57 (and thereby with the ring gear member 44 via the interconnecting member 70) through the clutch 69.

Figure 2:
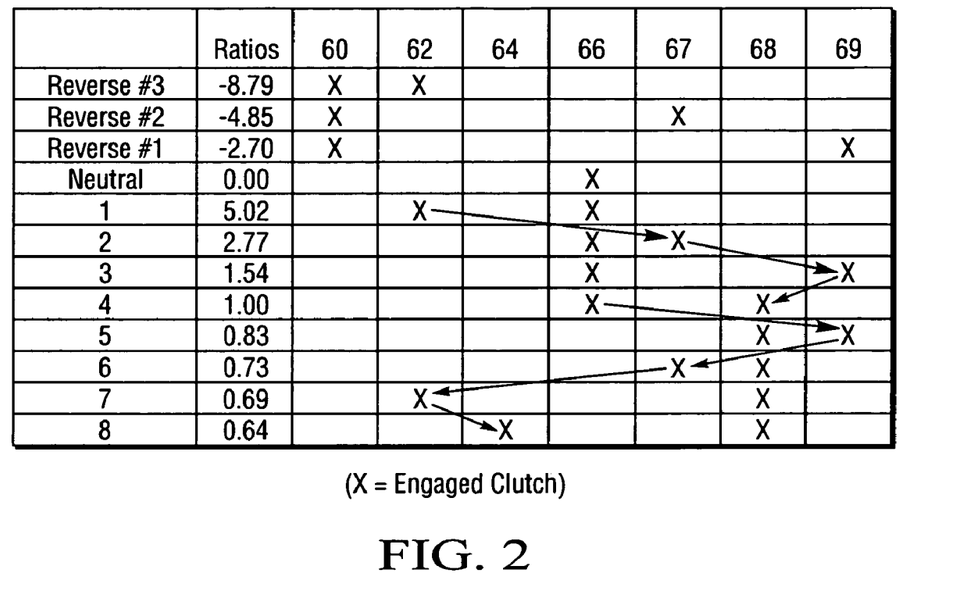
FIG. 2 is a truth table depicting some of the operating characteristics of the transmission shown in FIG. 1.

As shown in the truth table of FIG. 2, the torque-transmitting mechanisms 60, 62, 64, 66, 67, 68 and 69 are selectively engagable in combinations of two to provide eight forward speed ratios and three reverse speed ratios.

The third reverse (Reverse #3) speed ratio is established with the engagement of the brakes 60 and 62. The brake 60 connects the carrier member 37 with the stationary transmission housing 80 and the brake 62 connects the ring gear member 54 with the transmission housing 80. The sun gear member 52 rotates at the same speed as the input shaft 17. The carrier member 57 rotates at the same speed as the ring gear member 44. The ring gear member 54 does not rotate. The carrier member 57 rotates at a speed determined from the speed of the sun gear member 52 and the ring gear/sun gear tooth ratio of the planetary gear set 50. The carrier member 47 rotates at the same speed as the sun gear member 32. The sun gear member 42 does not rotate. The carrier member 47 rotates at a speed determined from the speed of the ring gear member 44 and the ring gear/sun gear tooth ratio of the planetary gear set 40. The carrier member 37 does not rotate. The ring gear member 34 rotates at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the third reverse (Reverse #3) speed ratio is determined utilizing the ring gear/sun gear tooth ratios of the planetary gear sets 30, 40 and 50.

The second reverse (Reverse #2) speed ratio is established with the engagement of the brake 60 and the clutch 67. The brake 60 grounds the carrier member 37 to the transmission housing 80, and the clutch 67 connects the carrier member 57 (and the sun gear member 32 via the interconnecting member 72) with the ring gear member 54. The sun gear member 52 rotates at the same speed as the input shaft 17. The carrier member 57 rotates at the same speed as the ring gear member 44. The ring gear member 54, the carrier member 47 and the sun gear member 32 rotate at the same speed. The ring gear member 54, and therefore the sun gear member 32, rotates at a speed determined from the speed of the carrier member 57, the speed of the sun gear member 52 and the ring gear/sun gear tooth ratio of the planetary gear set 50. The carrier member 37 does not rotate. The ring gear member 34 rotates at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the second reverse (Reverse #2) speed ratio is determined utilizing the ring gear/sun gear tooth ratios of the planetary gear sets 30 and 50.

The first reverse (Reverse #1) speed ratio is established with the engagement of the brake 60 and the clutch 69. The brake 60 grounds the carrier member 37 to the transmission housing 80, and the clutch 69 connects the carrier member 57 with the sun gear member 52 and thereby with the input shaft 17. The planetary gear set 50 and the ring gear member 44 rotate at the same speed as the input shaft 17. The carrier member 47 rotates at the same speed as the sun gear member 32. The sun gear member 42 does not rotate. The carrier member 47 rotates at a speed determined from the speed of the ring gear member 44 and the ring gear/sun gear tooth ratio of the planetary gear set 40. The carrier member 37 does not rotate. The ring gear member 34 rotates at the same speed as the output shaft 19. The ring gear member 34, and therefore the output shaft 19, rotates at a speed determined from the speed of the sun gear member 32 and the ring gear/sun gear tooth ratio of the planetary gear set 30. The numerical value of the first reverse (Reverse #1) speed ratio is determined utilizing the ring gear/sun gear tooth ratios of the planetary gear sets 30 and 40.

The first forward speed ratio is established with the engagement of the brake 62 and the clutch 66. The brake 62 grounds the ring gear member 54 to the transmission housing 80, and the clutch 66 connects the sun gear member 32 with the carrier member 37. The sun gear member 52 rotates at the same speed as the input shaft 17. The carrier member 57 rotates at the same speed as the ring gear member 44. The ring gear member 54 does not rotate. The carrier member 57 rotates at a speed determined from the speed of the sun gear member 52 and the ring gear/sun gear tooth ratio of the planetary gear set 50. The sun gear member 42 does not rotate. The carrier member 47 and the planetary gear set 30 rotate at the same speed as the output shaft 19. The carrier member 47, and therefore the output shaft 19, rotates at a speed determined from the speed of the ring gear member 44 and the ring gear/sun gear tooth ratio of the planetary gear set 40. The numerical value of the first forward speed ratio is determined utilizing the ring gear/sun gear tooth ratios of the planetary gear sets 40 and 50.

The second forward speed ratio is established with the engagement of the clutches 66 and 67. The clutch 66 connects the sun gear member 32 with the carrier member 37, and the clutch 67 connects the carrier member 47 with the ring gear member 54. The sun gear member 52 rotates at the same speed as the input shaft 17. The carrier member 57 rotates at the same speed as the ring gear member 44. The ring gear member 54, the carrier member 47 and the planetary gear set 30 rotate at the same speed as the output shaft 19. The ring gear member 54, and therefore the output shaft 19, rotates at a speed determined from the speed of the carrier member 57, the speed of the sun gear member 52 and the ring gear/sun gear tooth ratio of the planetary gear set 50. The numerical value of the second forward speed ratio is determined utilizing the ring gear/sun gear tooth ratio of the planetary gear set 50.

The third forward speed ratio is established with the engagement of the clutches 66 and 69. The clutch 66 connects the sun gear member 52 with the carrier member 57, and the clutch 69 connects the carrier member 57 with the sun gear member 52 and the input shaft 17. The planetary gear set 50 and the ring gear member 44 rotate at the same speed as the input shaft 17. The carrier member 47 and the planetary gear set 30 rotate at the same speed as the output shaft 19. The sun gear member 42 does not rotate. The-carrier member 47, and therefore the output shaft 19, rotates at a speed determined from the speed of the ring gear member 44 and the ring gear/sun gear tooth ratio of the planetary gear set 40. The numerical value of the third forward speed ratio is determined utilizing the ring gear/sun gear tooth ratio of the planetary gear set 40.

The fourth forward speed ratio is established with the engagement of the clutches 66 and 68. The clutch 66 connects the carrier member 37 with the sun gear member 32, and the clutch 68 connects the input shaft 17 and sun gear member 52 with the carrier member 37. In this configuration, the planetary gear set 30 and the output shaft 19 rotate at the same speed as the input shaft 17. The numerical value of the fourth forward speed ratio is 1.00.

The fifth forward speed ratio is established with the engagement of the clutches 68 and 69. The clutch 68 connects the carrier member 37 with the sun gear member 52, and the clutch 69 connects the sun gear member 52 with carrier member 57. The planetary gear set 50, the ring gear member 44 and the carrier member 37 rotate at the same speed as the input shaft 17. The carrier member 47 rotates at the same speed as the sun gear member 32. The sun gear member 42 does not rotate. The carrier member 47 rotates at a speed determined from the speed of the ring gear member 44 and the ring gear/sun gear tooth ratio of the planetary gear set 40. The ring gear member 34 rotates at the same speed as the output shaft 19. The ring gear member 34, and therefore the output shaft 19, rotates at a speed determined from the speed of the carrier member 37, the speed of the sun gear member 32 and the ring gear/sun gear tooth ratio of the planetary gear set 30. The numerical value of the fifth forward speed ratio is determined utilizing the ring gear/sun gear tooth ratios of the planetary gear sets 30 and 40.

The sixth forward speed ratio is established with the engagement of the clutches 67 and 68. The clutch 67 connects the carrier member 47 with the ring gear member 54, and the clutch 68 connects the carrier member 37 with the sun gear member 52, and therefore with the input shaft 17. The sun gear member 52 and the carrier member 37 rotate at the same speed as the input shaft 17. The carrier member 57 rotates as the same speed as the ring gear member 44. The ring gear member 54 and the carrier member 47 rotate at the same speed as the sun gear member 32. The ring gear member 54, and therefore the sun gear member 32, rotates at a speed determined from the speed of the carrier member 57, the speed of the sun gear member 52 and the ring gear/sun gear tooth ratio of the planetary gear set 50. The ring gear member 34 rotates at the same speed as the output shaft 19. The ring gear member 34, and therefore the output shaft 19, rotates at a speed determined from the speed of the carrier member 37, the speed of the sun gear member 32 and the ring gear/sun gear tooth ratio of the planetary gear set 30. The numerical value of the sixth forward speed ratio is determined utilizing the ring gear/sun gear tooth ratios of the planetary gear sets 30 and 50.

The seventh forward speed ratio is established with the engagement of the brake 62 and the clutch 68. The brake 62 grounds the ring gear member 54 with the transmission housing 80, and the clutch 68 connects the carrier member 37 with the sun gear member 52 and therefore with the input shaft 17. The sun gear member 52 and the carrier member 37 rotate at the same speed as the input shaft 17. The carrier member 57 rotates at the same speed as the ring gear member 44. The ring gear member 54 does not rotate. The carrier member 57 rotates at a speed determined from the speed of the sun gear member 52 and the ring gear/sun gear tooth ratio of the planetary gear set 50. The carrier member 47 rotates at the same speed as the sun gear member 32. The sun gear member 42 does not rotate. The carrier member 47 rotates at a speed determined from the speed of the ring gear member 44 and the ring gear/sun gear tooth ratio of the planetary gear set 40. The ring gear member 34 rotates at the same speed as the output shaft 19. The ring gear member 34, and therefore the output shaft 19, rotates at a speed determined from the speed of the carrier member 37, the speed of the sun gear member 32 and the ring gear/sun gear tooth ratio of the planetary gear set 30. The numerical value of the seventh forward speed ratio is determined utilizing the ring gear/sun gear tooth ratios of the planetary gear sets 30, 40 and 50.

The eighth forward speed ratio is established with the engagement of the brake 64 and the clutch 68. The brake 64 grounds the carrier member 47 to the transmission housing 80, and the clutch 68 connects the carrier member 37 with the sun gear member 52, and therefore with the input shaft 17. The carrier member 37 rotates at the same speed as the sun gear member 52 and the input shaft 17. The sun gear member 32, the planetary gear set 40 and the carrier member 57 do not rotate. The ring gear member 34 rotates at the same speed as the output shaft 19. The ring gear member 34, and therefore the output shaft 19, rotates at a speed determined from the speed of the carrier member 37 and the ring gear/sun gear tooth ratio of the planetary gear set 30. The numerical value of the eighth forward speed ratio is determined utilizing the ring gear/sun gear tooth ratio of the planetary gear set 30.

Figure 3:
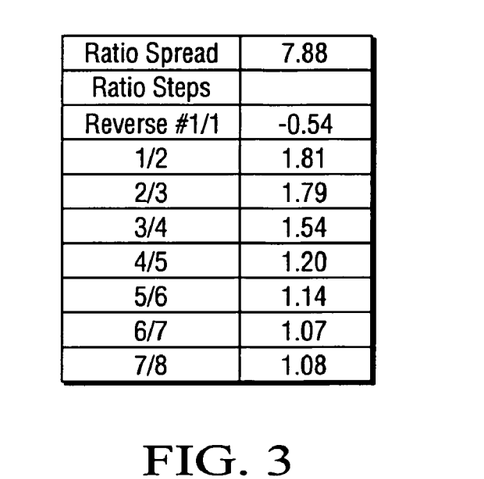
FIG. 3 is a chart depicting other operating characteristics of the transmission shown in FIG. 1.

As set forth above, the engagement schedule for the torque-transmitting mechanisms of the transmission 14 of FIG. 1 is shown in the truth table of FIG. 2. The truth table of FIG. 2 also provides an example of speed ratios that are available utilizing the following ring gear/sun gear tooth ratios: $N_{R1}/N_{S1}=1.75$ (value of the tooth ratio of the planetary gear set 30); $N_{R2}/N_{S2}=1.84$ (value of the tooth ratio of the planetary gear set 40); and $N_{R3}/N_{S3}=2.25$ (value of the tooth ratio of the planetary gear set 50). The chart of FIG. 3 describes the ratio steps attained utilizing these sample tooth ratios. For example, the step ratio between the first and second forward speed ratios is 1.81, while the step ratio between the first reverse speed ratio (Reverse #1) and the first forward speed ratio is −0.54. It should be noted that both the single and double step forward ratio changes as well as the reverse ratio changes are of the single transition variety.

Figure 4:
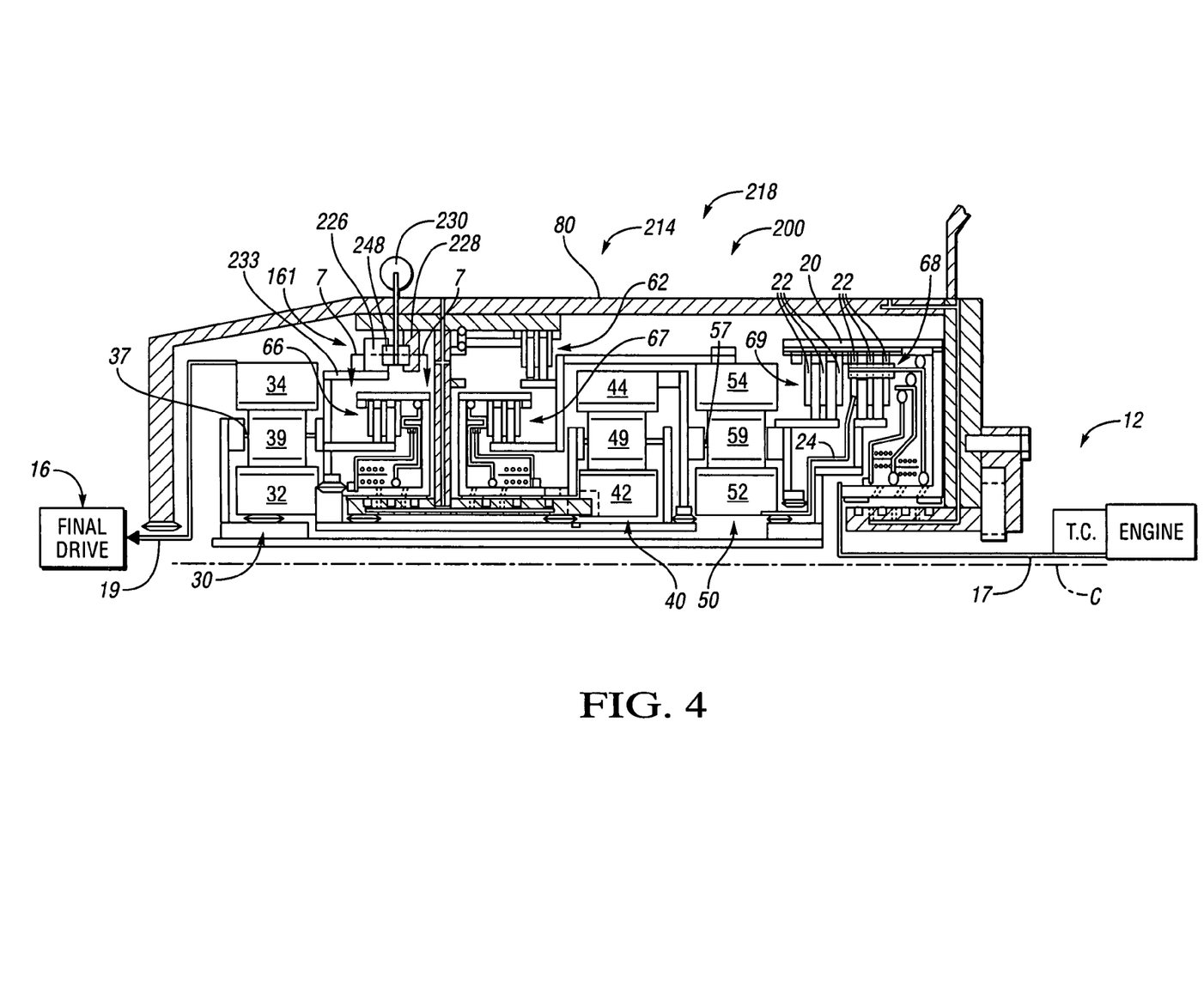
FIG. 4 is a schematic cross-sectional representation of a second embodiment of a powertrain having a transmission utilizing five torque-transmitting mechanisms to achieve seven forward speed ratios as well as a selectable one-way clutch to obtain three reverse speed ratios.
Figure 5:
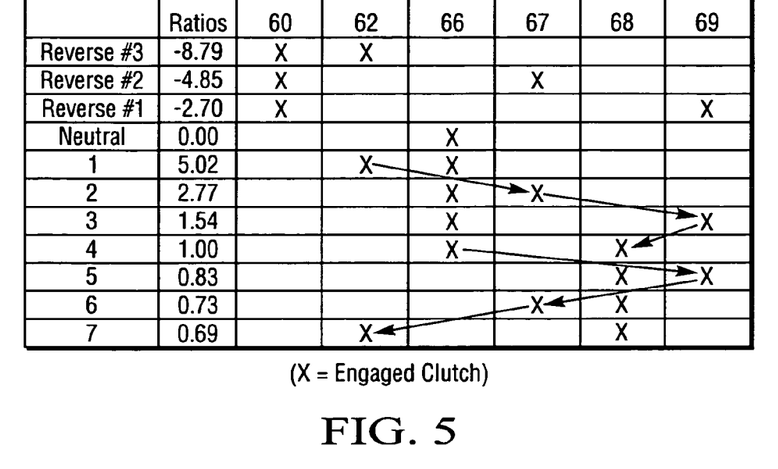
FIG. 5 is a truth table depicting some of the operating characteristics of the powertrain shown in FIG. 4.
Figure 6:
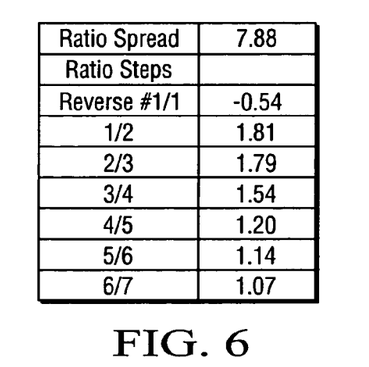
FIG. 6 is a chart depicting other operating characteristics of the powertrain of FIG. 4.

FIG. 4 shows another embodiment of a powertrain 200 having a planetary transmission 214 and a planetary gear arrangement 218. The transmission 214 is the same as the transmission 14 of FIG. 1 expect that brake 64 is removed and brake 60 is replaced with a selectable one-way clutch (SOWC) 161. With the elimination of brake 64, only seven forward speed ratios are achieved. The SOWC 161 is utilized in each of the three reverse speed ratios, as indicated in the truth table of FIG. 5. As described above for the transmission 14 of FIG. 1, those skilled in the art will understand from the truth table of FIG. 5 how the speed ratios are established through the planetary gear sets 30, 40 and 50. Assuming the same tooth ratio values described above with respect to the transmission 14 in FIG. 1, the ratio steps indicated in FIG. 6 may be achieved. According to a preferred embodiment of the present invention, the SOWC 161 is a mechanical diode-based SOWC. It should be appreciated, however, that according to alternate embodiments the mechanical diode-based SOWC 161 may be replaced with other selectable one-way clutches. The SOWC 61 is potentially a lower cost option than a friction based torque-transmitting mechanism and avoids spin losses associated with hydraulically applied friction based torque-transmitting mechanisms.

Figure 7:
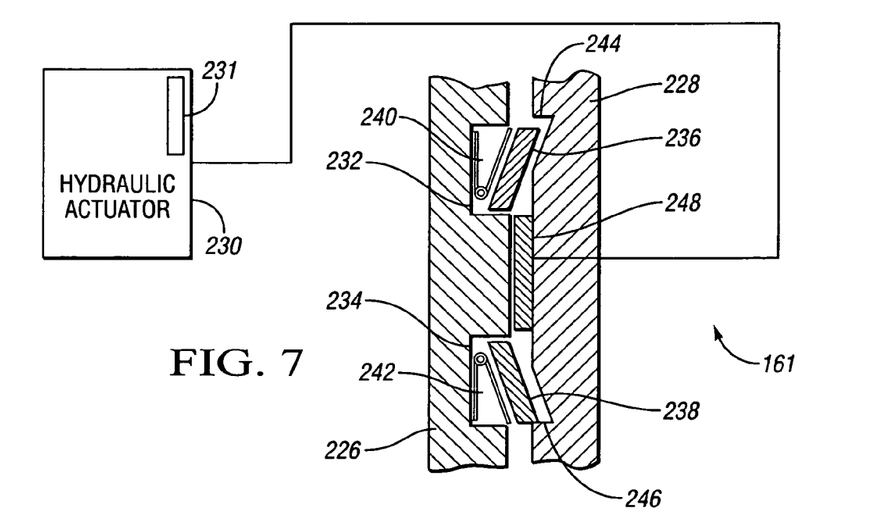
FIG. 7 is a schematic cross-sectional representation of the selectable one-way clutch used in the transmission of FIG. 4.

As shown in FIG. 4, the SOWC 161 includes a first and second race 226, 228. The SOWC 161 and the races 226, 228 are shown in more detail in FIG. 7, which is a schematic cross-sectional view taken at the arrows indicated in FIG. 4. The first race 226 is connected for common rotation with a hub member 233 that is connected to the carrier member 37. The second race 228 is grounded to the transmission housing 80. The first race 226 is configured to selectively either spin relative to the second race 228 (i.e., freewheel), or lock-up as a single grounded unit. Referring to FIG. 7, the first race 226 defines first and second recessed portions 232, 234 adapted to respectively retain first and second struts 236, 238, and first and second springs 240, 242. The second race 228 defines first and second engagement shoulders 244, 246 each adapted to engage one of the first and second struts 236, 238 to lock-up the clutch 161.

When the first and second springs 240, 242 are in a compressed position, the struts 236, 238 are retracted within the recessed portions 232, 234 of the race 226 such that the shoulders 244, 246 are not engaged and the first race 226 freewheels in both clockwise and counter-clockwise directions. When the first and second springs 240, 242 are in an extended position, the struts 236, 238 protract from their respective recessed portions 232, 234 and respectively engage the first and second engagement shoulders 244, 246 such that the SOWC 161 locks-up in both clockwise and counter-clockwise directions. Additionally, by compressing one of the springs 240, 242 and extending the other, the SOWC 161 can be locked-up in one direction and freewheel in the opposite direction.

The springs 240, 242 are configured to push the struts 236, 238 into engagement with the shoulders 244, 246 such that in the steady state position the SOWC 161 is locked-up in both directions. Therefore, for purposes of releasing the SOWC 161, a selector plate 248 (shown in both FIGS. 4 and 7) is provided. The selector plate 248 is adapted to selectively translate and engage one of the struts 236, 238 such that the engaged strut is pushed toward its respective recessed portion 232, 234 and out of engagement with its respective shoulder 244, 246. As an example, the selector plate 248 may be translated into engagement with strut 236 thereby compressing the spring 240 and retracting the strut 236 out of engagement with the shoulder 244 such that race 226 is rotatable in a clockwise direction relative to race 228. Conversely, the selector plate 248 may be translated into engagement with strut 238 thereby compressing the spring 242 and retracting the strut 238 out of engagement with the shoulder 246 such that race 226 is rotatable in a counter-clockwise direction relative to race 228.

According to a preferred embodiment, the selector plate 248 is hydraulically translatable using a conventional hydraulic device such as the hydraulic actuator 230. The hydraulic actuator 230 includes a return spring 231 adapted to push the selector plate 248 into engagement with one of the struts 236, 238 such that SOWC 161 is mechanically biased into a one-way operational mode. Hydraulic actuation of the selector plate 248 by the actuator 230 overcomes the return spring 231 and translates the selector plate 248 into a position between the struts 236, 238 such that the SOWC 161 is locked in both directions. In this manner, the SOWC 161 is hydraulically engaged with the actuator 230 and mechanically released with the return spring 231.

Thus, the transmission 214 of FIG. 4 achieves seven forward speed ratios utilizing only five torque-transmitting mechanisms and also achieves three reverse speed ratios by utilizing the torque-transmitting mechanisms in combination with the SOWC 161.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
an input member;
an output member;
a clutch housing connected for common rotation with said input member;
a first set of plates continuously extending from said clutch housing for common rotation therewith;
a first gear member;
a rotatable hub member continuously and non-selectively connected for common rotation with one of said plates of said first set, said rotatable hub member thereby being continuously and non-selectively connected for common rotation with said clutch housing and said input member; and wherein said rotatable hub member is continuously and non-selectively connected for common rotation with said first gear member, said first gear member thereby being continuously and non-selectively connected for common rotation with said input member;
a second gear member;
a first torque-transmitting mechanism having a second set of plates selectively engagable with selected plates of said first set of plates on a side of said hub member; wherein said second set of plates are connected with said second gear member, selective engagement of said first torque-transmitting mechanism thereby connecting said input member with said second gear member;
a third gear member;
a second torque-transmitting mechanism having additional plates selectively engagable with other selected ones of said first set of plates on a second side of said hub member; wherein said additional plates of said second torque-transmitting mechanism are connected with said third gear member; selective engagement of said second torque-transmitting mechanism thereby connecting said input member with said third gear member;

wherein one of said gear members is a member of one planetary gear set and another of said gear members is a member of another planetary gear set;

wherein said one and said another planetary gear sets are axially spaced from said first and second torque-transmitting mechanisms;

an additional planetary gear set axially spaced from said one and said another planetary gear sets and from said hub member; wherein said hub member and said planetary gear sets rotate about a common axis;

a third, a fourth and a fifth torque-transmitting mechanism;

wherein said torque-transmitting mechanisms are selectively engagable in pairs to establish seven forward speed ratios between said input member and said output member;

a selectively actuatable hydraulic one-way clutch; and wherein selective actuation of said one-way clutch and engagement of selected ones of said torque-transmitting mechanisms establishes three reverse speed ratios between said input member and said output member.

2. The transmission of claim 1, further comprising:

a transmission casing;

a center support member extending from said casing;

wherein said center support has channels for providing hydraulic fluid to at least one of said third, fourth, and fifth torque-transmitting mechanisms.

3. The transmission of claim 2, wherein one of said third, fourth, and fifth torque-transmitting mechanisms is packaged adjacent said center support such that torque of said one of said third, fourth, and fifth torque-transmitting mechanisms acts against said center support.

4. A transmission comprising:

an input member;

an output member;

a first, a second and a third planetary gear set each having first, second and third members;

said input member being continuously interconnected with a member of said planetary gear sets, and said output member being continuously interconnected with another member of said planetary gear sets;

a first interconnecting member continuously interconnecting said first member of said first planetary gear set with said first member of said second planetary gear set;

a second interconnecting member continuously interconnecting said second member of said second planetary gear set with said first member of said third planetary gear set; wherein said third member of said second planetary gear set is continuously connected with a stationary member;

five torque-transmitting mechanisms for selectively interconnecting said members of said planetary gear sets with said input member, with said stationary member or with other members of said planetary gear sets, said five torque-transmitting mechanisms being engaged in combinations of two to establish seven forward speed ratios between said input member and said output member; and a one-way hydraulic clutch selectively actuatable to ground one of said members to said stationary member;

wherein said one-way hydraulic clutch is actuated in combination with engagement of another one of said members to establish a reverse speed ratio between said input member and said output member.

5. The transmission of claim 4, further comprising:

a sixth torque-transmitting mechanism selectively engagable to connect said second member of said second planetary gear set with said stationary member to thereby establish an eighth forward speed ratio between said input member and said output member.

6. The transmission of claim 4, further comprising:

a clutch housing connected for common rotation with said input member; and a rotatable hub member connected for common rotation with said clutch housing;

wherein said member of said planetary gear set continuously connected with said input member is connected via said rotatable hub member and said clutch housing.

7. The transmission of claim 6, wherein two of said five torque-transmitting mechanisms are packaged radially inward of and enveloped by said clutch housing.

* * * * *